United States Patent [19]

Yamaguchi

[11] Patent Number: 4,619,233

[45] Date of Patent: Oct. 28, 1986

[54] FUEL INJECTION SYSTEM FOR INTERNAL COMBUSTION ENGINES

[75] Inventor: Susumu Yamaguchi, Higashi-Matsuyama, Japan

[73] Assignee: Diesel Kiki Co., Ltd., Tokyo, Japan

[21] Appl. No.: 746,115

[22] Filed: Jun. 18, 1985

[30] Foreign Application Priority Data

Jun. 29, 1984 [JP] Japan ............................ 59-98163[U]

[51] Int. Cl.$^4$ ............................................. F02D 31/00
[52] U.S. Cl. ...................................... 123/357; 123/500
[58] Field of Search ............... 123/446, 501, 500, 504, 123/357, 358, 359, 495

[56] References Cited

U.S. PATENT DOCUMENTS

| 2,147,390 | 2/1939 | Vaudet | 123/500 |
| 4,497,294 | 2/1985 | Izumi et al. | 123/357 |

FOREIGN PATENT DOCUMENTS

| 75802 | 4/1983 | European Pat. Off. | 123/357 |
| 758184 | 1/1934 | France | 123/501 |
| 164773 | 12/1980 | Japan | 123/500 |
| 146032 | 9/1982 | Japan | 123/357 |

Primary Examiner—Magdalen Y. C. Greenlief
Attorney, Agent, or Firm—Wenderoth, Lind & Ponack

[57] ABSTRACT

An improved fuel injection system of the type in which the fuel injection timing and the fuel injection rate vary with the plunger pre-stroke which is regulated by displacing a control sleeve slidably fitted on a plunger reciprocating at a non-uniform speed and in which the actual injection quantity varies with the pre-stroke. The fuel injection system comprise an engine operating condition sensor, a pre-stroke control means, and a control sleeve driving means that cooperate to adjust the plunger pre-stroke. The amount of pre-stroke is detected by a position sensor. The position sensor and the engine operating condition sensor deliver respective outputs to a correction arithmetic means which computes the amount of deviation and thereby the amount of correction based on the outputs delivered. The arithmetic means sends an output signal indicative of the amount of correction to an injection quantity control means which in turn corrects the object injection quantity and then delivers a control signal to a plunger driving means by means of which the plunger is rotated, thereby adjusting the effective stroke of the plunger according to the amount of pre-stroke.

3 Claims, 8 Drawing Figures

FUEL INJECTION SYSTEM FOR INTERNAL COMBUSTION ENGINES

BACKGROUND OF THE INVENTION

1. Field of the Invention:

The present invention relates to a fuel injection system for internal combustion engines such as diesel engines, and more particularly to an improvement in a control system for such a fuel injection system.

2. Prior Art:

A fuel injection pump having a variable pre-stroke mechanism is known as disclosed in Japanese Patent Laid-open Publication No. 55-131562. The disclosed pump includes a reciprocably movable plunger driven by an engine embodying the pump, and a control sleeve slidably fitted on the plunger and axially movable for adjusting the pre-stroke of the plunger. In such fuel injection pump, a non-uniform velocity cam is used as a motion transfer mechanism between the engine and the plunger so as to reciprocate the plunger at a non-uniform speed, thereby simultaniously changing the fuel injection timing and the fuel injection rate which is in dependency on the advancing velocity of the plunger. To improve the fuel consumption and to reduce the noise and exhaust gas concentration, usually the fuel injection rate is so regulated as to be larger in the low speed operation of the engine than in the ordinary or higher speed operation of the engine.

However, according to the known fuel injection pump, the pre-stroke adjustment and the fuel injection quantity adjustment are conducted separately without any linkage or interrelation therebetween. Accordingly, it is difficult to achieve an accurate fuel injection quantity control. Stated more specifically, the fuel injection rate is increased as the plunger pre-stroke increases even when the plunger effective stroke is constant. As a result, the injection pressure increases and the actual injection quantity also becomes larger by 10–20 mm$^3$/stroke and more than that at the low fuel injection rate. In the known fuel injection system, the correction of the actual injection quantity in view of a change in the fuel injection rate is not considered.

SUMMARY OF THE INVENTION

It is therefore an object of the present invention to provide a fuel injection system which can accurately control the injection quantity even when the fuel injection rate varies.

According to the present invention, the foregoing and other objects are attained by providing a fuel injection system for an internal combustion engine, comprising:

(a) a fuel injection pump driven by the engine for fuel injection thereto and including a plunger reciprocably movable at a non-uniform speed and a control sleeve slidably fitted on said plunger;

(b) first drive means operatively connected with said plunger for rotating the latter to thereby adjust the effective stroke of said plunger;

(c) second drive means operatively connected with said control sleeve for displacing the latter in an axial direction to thereby adjust the pre-stroke of said control sleeve;

(d) an operation sensor for detecting operating conditions of the engine;

(e) a position sensor for detecting a position of said control sleeve;

(f) first arithmetic means responsive to the engine operating conditions detected by said operation sensor, for computing an object injection quantity;

(g) second arithmetic means responsive to the position of said control sleeve detected by said position sensor, for computing an object pre-stroke of said plunger;

(h) third arithmetic means responsive to the engine operating conditions detected and the position of said control sleeve detected, for computing a correction amount;

(i) first control means responsive to said correction amount computed by said third arithmetic means, for correcting said object injection quantity and for delivering a control signal to said first drive means; and (j) second control means responsive to the object injection quantity computed by said second arithmetic means, for delivering a control signal to said second drive means.

The fuel injection timing and the fuel injection rate vary with the plunger pre-stroke which is regulated by displacing a control sleeve slidably fitted on a plunger reciprocating at a non-uniform speed. The regulation of the plunger pre-stroke is achieved by an engine operating condition sensor, a pre-stroke control means, and a control sleeve driving means. The actual injection quantity varies with the pre-stroke. The amount of pre-stroke is detected by a position sensor. The position sensor and the engine operating condition sensor deliver respective outputs to a correction arithmetic means which computes the amount of deviation and thereby the amount of correction based on the outputs delivered. The arithmetic means sends an output signal indicative of the amount of correction to a injection quantity control means which in turn corrects the object injection quantity and then delivers a control signal to a plunger driving means. The plunger driving means rotates the plunger to adjust the effective stroke of the latter according to the amount of pre-stroke.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 2:
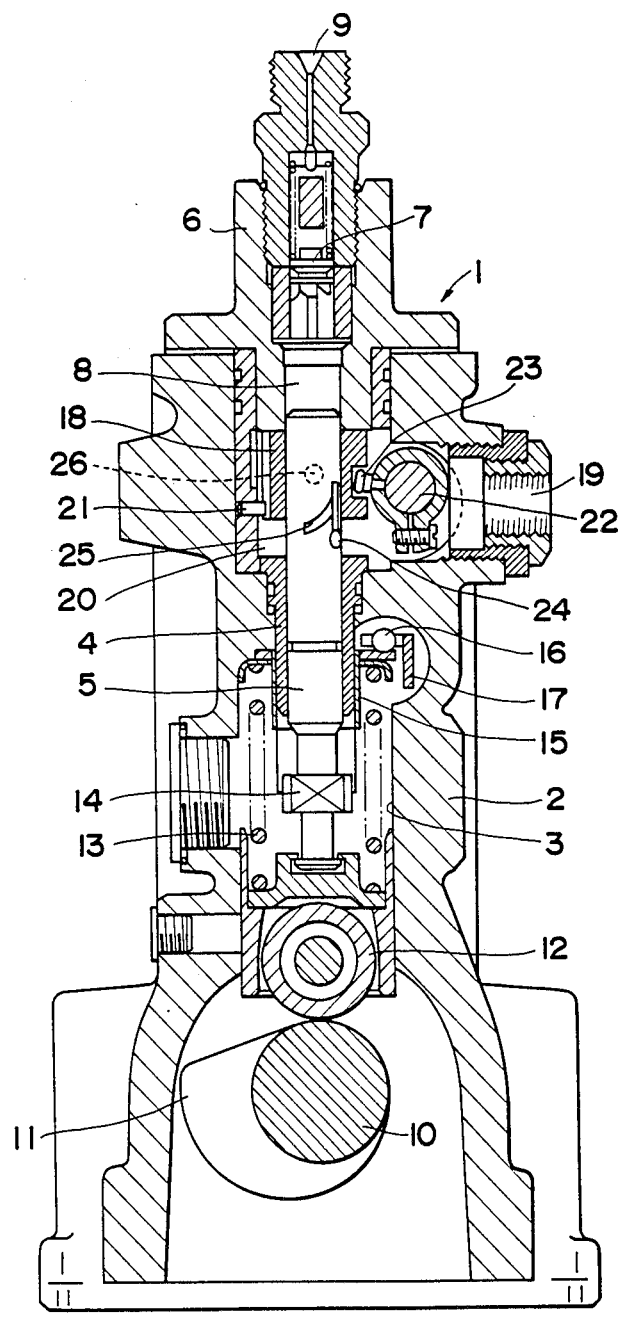
FIG. 2 is a cross-sectional view of a fuel injection pump embodied in the fuel injection system shown in FIG. 1.

As shown in FIG. 2, a fuel injection pump 1 includes a housing having a vertical or longitudinal hole 3 in which a plunger barrel 4 is fixedly mounted. A plunger 5 is slidably fitted in the plunger barrel 4 for simultaneous reciprocating and rotary motion. The plunger 5 has an upper end mounted within a valve housing 6 secured to the top end of the pump housing 2. The valve housing 6 houses a delivery valve 7 mounted in alignment with the plunger 5 so as to define therebetween a compression chamber 8. The compression chamber 8 is communicatable with a discharge port 9 via the delivery valve 7.

Figure 4:
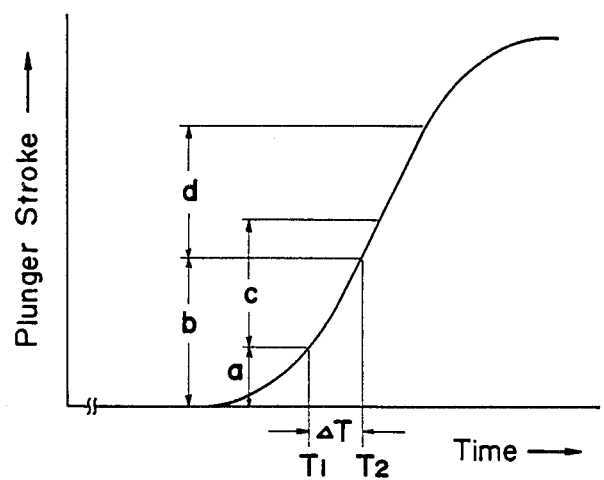
FIG. 4 is a graph illustrative of a performance curve of a cam used in the fuel injection pump.

The lower end of the plunger 5 is held in driven connection with a cam 11 through a tappet 12. The cam is formed on a cam shaft 10 and has a cam profile by means of which a cam performance curve shown in FIG. 4 is achieved. The tappet 12 is urged by a compression coil spring 13 toward the cam 11 so that the rotation of the cam 11 at a uniform speed causes the plunger 5 to reciprocate at a non-uniform speed according to the given profile of the cam 11.

The plunger 5 has a face portion 14 coupled with an injection quantity setting sleeve 15 to which is secured a engagement projection 16 held in engagement with a control rack 17. The plunger 5 is thus rotatably movable for angular positional adjustment in response to the movement of the control rack 17. The control rack 17 is connected under control to a governor actuator disposed in an electronic governor 35 (FIG. 5), the governor actuator constituting a first drive means 100 shown in FIG. 1.

A control sleeve 18 is disposed in a fuel chamber 20 above the plunger barrel 4 and slidably fitted on the plunger 5, the fuel chamber 20 communicating with an inlet port 19. The control sleeve 18 is non-rotatable due to engagement with a guide pin 21 received in an axial slot in the sleeve 18 but it is axially movable due to engagement with an actuating pin 23 mounted on a control rod 22. The plunger 5 has a radial fuel intake and discharge port 24, an axial fuel passage (not shown) communicating the intake and discharge port 24 with the compression chamber 8, and a helical groove 25 formed in the peripheral surface of the plunger 5 in communicating with the intake and discharge port 24. The control sleeve 18 has a radial cut-off port 26 communicating with the fuel chamber 20.

With the fuel injection pump 1 thus constructed, when the plunger 5 is located at the lowermost or the lower dead point as shown in FIG. 2, the intake and discharge port 24 faces the fuel chamber 20, thereby communicating the compression chamber 8 with the fuel chamber 20. In this condition, the pressure in the compression chamber 8 is not increased and hence the delivery valve 7 is closed. Upward movement of the plunger 5 causes the intake and the discharge port 24 to be closed by the inner peripheral surface of the control sleeve 18 whereupon the pressure within the compression chamber 8 is increased. The increased fuel pressure urges the delivery valve 24 to open, thereby delivering fuel through the discharge port 9 to an injection nozzle (not shown) from which fuel is mutually injected into an engine cylinder (not shown). The amount of movement of the plunger 5 from one end or its lower dead point to the other end where the intake and discharge port 24 is closed, represents the pre-stroke of the plunger 5. The fuel injection begins when the intake and discharge port 24 is closed.

As the plunger 5 is further advanced, the helical groove 25 faces the cut-off port 26 to thereby communicate the compression chamber 8 with the fuel chamber 20. Accordingly, the pressure within the compression chamber 8 decreases and hence the delivery valve 7 is closed. The fuel injection is interrupted when the helical groove 24 communicates with the cut-off port 26. The amount of movement of the plunger 5 between the start of injection and the end of injection means the effective stroke of the plunger 5.

Figure 3:
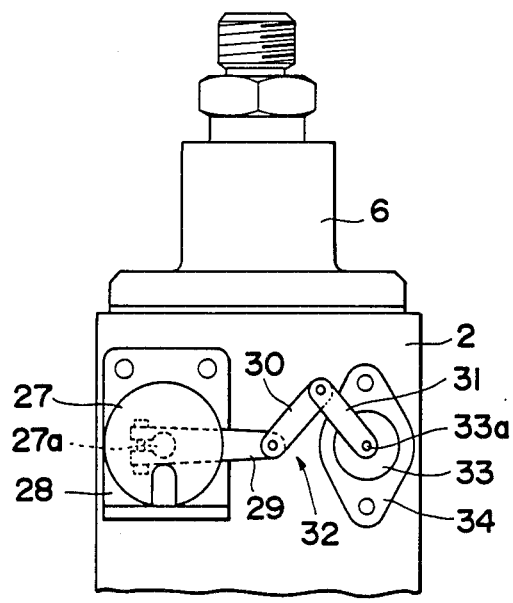
FIG. 3 is a fragmentary side elevational view of the fuel injection pump.

The control rod 22, as shown in FIG. 3, is coupled with a stepping motor 27 mounted on a support 28 secured to one side of the pump housing 2. The stepping motor 27 constitutes a second drive means 200 shown in FIG. 1. The stepping motor 27 has an output shaft 27a connected to the drive shaft 33a of a potentiometer 33 via a link mechanism 32 composed of three links 29–31. The potentiometer 33 is provided to electrically detect the operating position of the plunger 5 and thereby the pre-stroke of the plunger 5. Likewise the stepping motor 27, the potentiometer 33 is mounted on a support 34 secured to the one side of the pump housing 2, the potentiometer 33 constituting a position sensor 400 shown in FIG. 1.

Figure 5:
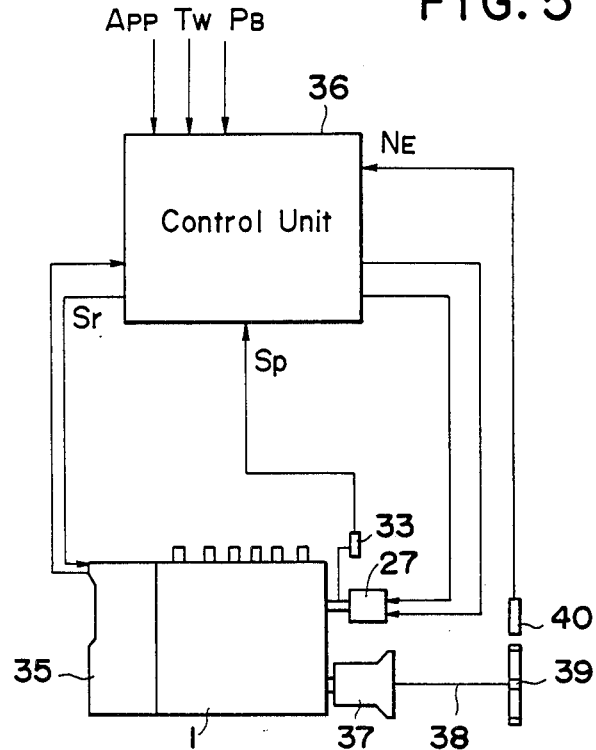
FIG. 5 is a diagrammatic view showing a control system for the fuel injection pump.

FIG. 5 diagrammatically shows a fuel injection control system according to the invention, in which the governor 35 is mounted on the fuel injection pump 1. The governor 35 comprises the governor actuator or the first drive means 100 (FIG. 1), and a rack sensor (not shown) for detecting the actual position Sr of the control rack 17 (FIG. 2) and then delivering an output signal indicative of the detected actual position to a control unit 36.

An input or drive shaft 38 is connected to the cam shaft 10 (FIG. 2) via a coupling 37 and is driven by the engine to rotate at a predetermined reduction ratio such as 2:1. A pulser disc 39 is mounted on the drive shaft 38 and a revolution sensor 40 is disposed in confronting relation to the pulser disc 39 to electrically detect the engine r.p.m. The revolution sensor 40 outputs a signal $N_E$ indicative of the detected engine r.p.m. to the control unit 36.

In addition to the signals indicative of the pre-stroke Sp detected by the potentiometer 33, the rack position Sr detected by the rack sensor and the engine r.p.m. $N_E$ detected by the revolution sensor 40, the control unit 36 also receives signals indicative of other engine operating conditions, such as the position App of the accelerator pedal, the temperature Tw of the engine cooling water or the lubricant oil, and the boost pressure $P_B$. Sensors detecting these factors Sp, Sr, $N_E$, App, Tw and $P_B$ constitute an engine operating condition sensor means 300. The control unit 36 arithmetically processes the detected signals and amplified the same to determine control signals which are then to be delivered to the governor actuator and the stepping motor 27.

Figure 6:
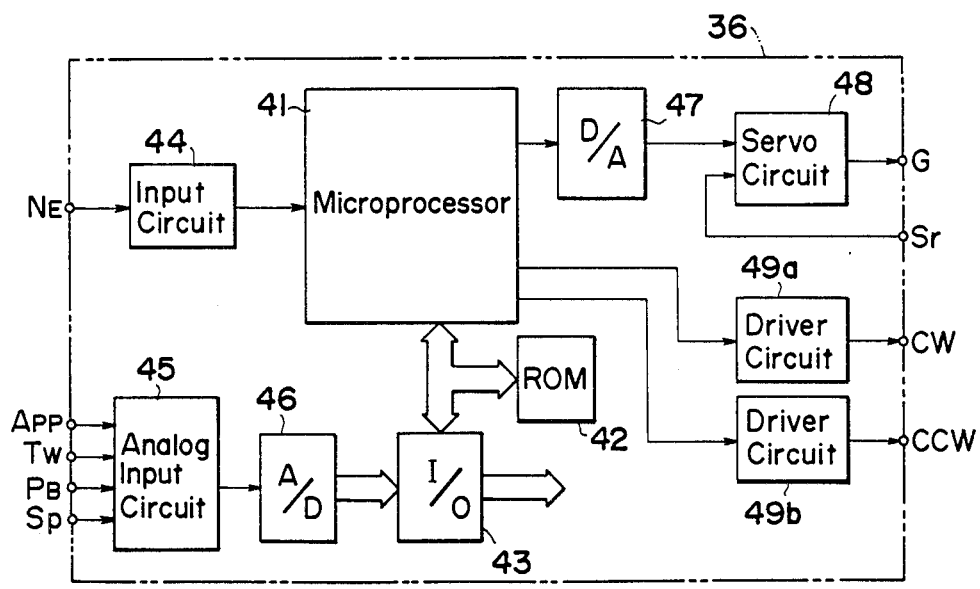
FIG. 6 is a block diagram showing a control circuit of the control system shown in FIG. 5.

As shown in FIG. 6, the control unit 36 includes a microprocessor 41 of the type known per se which comprises a control processing unit CPU, a random access memory RAM and a clock pulse generator. The microprocessor 41 is interconnected with a read-only memory (ROM) 42 for storing programs and fixed values, and an input and output device (I/O) 43 for input/output control, the microprocessor 41, ROM 42 and I/O 43 constituting a microcomputer. The engine r.p.m. $N_E$ is inputted into the microprocessor 41 through an input circuit 44 such as a wave shaping circuit. The signals App, Tw, Pw and Sp are inputted into an analog input circuit 45 composed of a multiplexer which delivers the signals to an A/D converter 46 upon receipt of a selection signal. The converted digital signals are sent to the I/O 43 and thence to the microprocessor 41. The I/O 43 outputs those signals to a display unit (not shown) for indication of the engine r.p.m. and other indica of troubles to be monitored.

Figure 7:
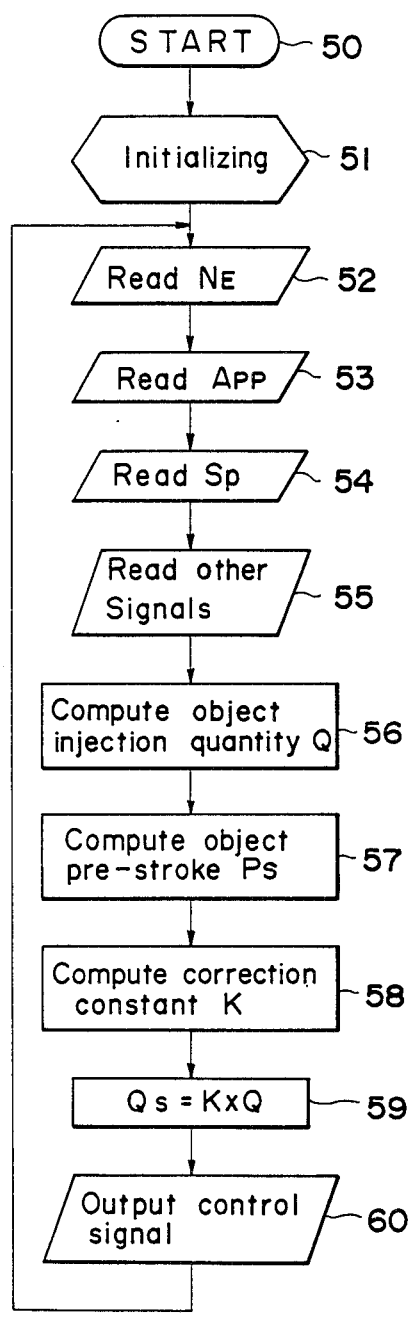
FIG. 7 is a flow chart illustrative of the operation program conducted in the control circuit.

The microprocessor 41 computes an object injection quantity and an object pre-stroke according to a program stored in the ROM 42 and produces digital signals indicative of the object injection quantity and pre-stroke thus computed. The object injection quantity signal is delivered to a D/A converter 47 where it is converted into analog signal. Then the analog signal is supplied to a servo circuit 48 where it is compared with the actual rack position signal Sr delivered from the rack sensor. If there is a difference between these signals, such difference will be amplified and then delivered to the governor actuator of the electronic governor 35 (FIG. 5). On the other hand, the object pre-stroke signal is delivered to driver circuits 49a, 49b. The driver circuit 49a sends a drive signal CW to the stepping motor 27 (FIG. which increases the pre-stroke by one step whereas an drive singal CWW delivered from the driver circuit 49b to the stepping motor 27 decreases the pre-stroke by one step. The control circuit of FIG. 6 operates in accordance with the program shown in FIG. 7.

Upon actuation of a power switch, not shown, the microprocessor 41 starts executing the operation program from a start step 50. In the next step 51, the RAM is initialized or cleared up. Then operation proceeds to a step 52 in which the engine r.p.m. $N_E$ signal is read and temporarily stored in the RAM in place of the preceding signal. Likewise, the accelerator pedal position signal App, the pre-stroke signal Sp, and the other signals Tw, $P_B$ are read, respectively, in the following three steps 53, 54 and 55. In the next step 56, an object injection quantity Q is computed based on the parameters App, Tw, $P_B$, thus this step 56 constituting an object injection quantity arithmetic means 500 shown in FIG. 1. In the next step 57, an object pre-stroke is computed baased on the parameters $N_E$, App and Q, this step 57 constituting an object pre-stroke arithmetic means 600 shown in FIG. 1.

Figure 1:
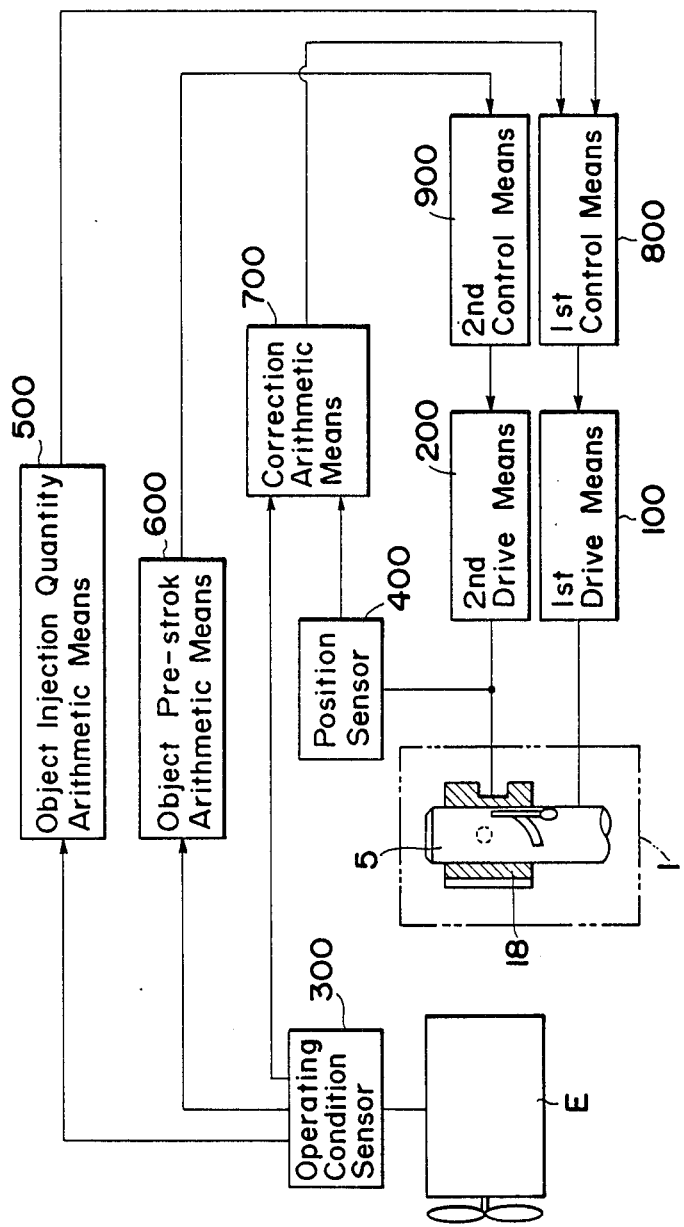
FIG. 1 is a block diagram showing a fuel injection system according to the present invention.
Figure 8:
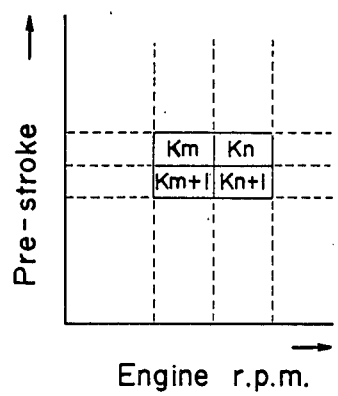
FIG. 8 is a graph illustrative of correction constants taken in conjunction with the pre-stroke and the engine r.p.m.

The next following step 58 constitutes a correction arithmetic means 700 shown in FIG. 1, in which as shown in FIG. 8, the engine r.p.m. $N_E$ and the pre-stroke Sp from the potentiometer are used as parameters for determining a constant K through interpolation carried out on the bases of the data stored in ROM as a two dimensional map. The constant K is set such that it becomes larger as the engine r.p.m. $N_E$ decreases but as the pre-stroke Sp becomes larger, and conversely the constant K becomes smaller as the engine r.p.m. $N_E$ becomes larger but as the pre-stroke Sp becomes smaller. In other words, the constant K is in direct proportion to the pre-stroke Sp but it is in inverse proportion to the engine r.p.m. $N_E$. This relation corresponds to a manner of change in fuel injection rate.

In the next step 59, a corrected object injection quantity Qs is obtained by the formula $Qs = K \times Q$. In the next step 60, the corrected object injection quantity Qs is outputted to the D/A converter 47, and at the same time, the object pre-stroke signal obtained in the step 57 is outputted to one of the drive circuits 49a, 49b, thereby controlling the injection quantity and the pre-stroke. Thus the step 60 constitutes to a first control means 800 and a second control means 900 shown in FIG. 1.

The fuel injection system thus constructed operates as follows: When the control rack 17 is actuated by the governor actuator, the plunger 5 is turned about its own axis to displace the position of the helical groove 25 with respect to the cut-off port 26, thereby varying the effective stroke of the plunger 5. The injection quantity also varies with the effective stroke of the plunger 5. As the control rod 22 is rotated by the stepping motor 27, the control sleeve 18 is moved in a vertical direction to vary the distance between the intake and discharge port 24 and the lower end of the control sleeve 18. As a result, the pre-stroke of the plunger 5 is varied. As shown in FIG. 4, the pre-stroke increases from the value a to the value b while the injection timing is advanced from the value T1 to the value T2 by a value ΔT. During that time, the effective stroke remains constant as indicated by reference characters c and d, however, the fuel injection rate increases due to an increase in inclination of the cam performance curve. The fuel injection rate is so regulated as to be larger in the lower speed operation of the engine by means of the control unit 36. As the fuel injection rate is increased, the injection quantity increases due to a sudden increase thereof at the begining of the injection. This tendency is particularly notable in the low speed operation of the engine. However, in the above-described step 58, a correction constant K is computed in dependency on the increase in injection quantity and a control signal is delivered to the governor actuator for cancelling out such increase in the injection quantity. The governor actuator then rotates the plunger 5 through the control rack 17 to thereby adjust the effective stroke of the plunger 5. Thus an optimum injection quantity for engine operating conditions can be injected to the engine cylinder.

Thus, a deviation from the object injection quantity is corrected by adjusting the pre-stroke of the plunger reciprocating at a non-uniform speed with the result that the injection quantity is always maintained at an optimum value for engine operating conditions. The fuel injection rate is also adjustable in dependancy on the engine operating conditions. With a result, an improved fuel consumption as well as reduced exhaust gas concentration and noise are attainable.

Obviously, many modifications and variations of the present invention are possible in the light of the above teachings. It is therefore to be understood that within the scope of the appended claims, the invention may be practiced otherwise than as specifically described.

What is claimed is:

1. A fuel injection system for an internal combustion engine, comprising:
   (a) a fuel injection pump driven by the engine for fuel injection thereto and including a plunger reciprocably movable at a non-uniform speed and a control sleeve slidably fitted on said plunger;
   (b) first drive means operatively connected with said plunger for rotating the latter to thereby adjust the effective stroke of said plunger;
   (c) second drive means operatively connected with said control sleeve for displacing the latter in an axial direction to thereby adjust the pre-stroke of said control sleeve;
   (d) an operation sensor for detecting operating conditions of the engine;

(e) a position sensor for detecting a position of said control sleeve;
(f) first arithmetic means responsive to the engine operating conditions detected by said operation sensor, for computing an object injection quantity;
(g) second arithmetic means responsive to the position of said control sleeve detected by said position sensor, for computing an object pre-stroke of said plunger;
(h) third arithmetic means responsive to the engine operating conditions detected and the position of said control sleeve detected, for computing a correction amount;
(i) first control means responsive to said correction amount computed by said third arithmetic means, for correcting said object injection quantity and for delivering a control signal to said first drive means; and
(j) second control means responsive to the object injection quantity computed by said second arithmetic means, for delivering a control signal to said second drive means.

2. A fuel injection system according to claim 1, said first drive means comprising a governor actuator.

3. A fuel injection system according to claim 1, said second drive means comprising a stepping motor.

* * * * *